United States Patent [19]

Rao

[11] Patent Number: 5,812,708
[45] Date of Patent: Sep. 22, 1998

[54] METHOD AND APPARATUS FOR DISTRIBUTING AN OPTICAL CLOCK IN AN INTEGRATED CIRCUIT

[75] Inventor: Vallur R. Rao, Saratoga, Calif.

[73] Assignee: Intel Corporation, Santa Clara, Calif.

[21] Appl. No.: 775,408

[22] Filed: Dec. 31, 1996

[51] Int. Cl.$^6$ .............................. G02B 6/12; H01L 27/14; H01S 3/18
[52] U.S. Cl. ........................... 385/14; 385/129; 385/130; 385/131; 257/431; 257/432; 372/43; 372/50
[58] Field of Search ..................................... 257/431, 432; 385/14, 129, 130, 131; 372/43, 50

[56] References Cited

U.S. PATENT DOCUMENTS

| | | | |
|---|---|---|---|
| 5,009,476 | 4/1991 | Reid et al. | 385/14 X |
| 5,208,879 | 5/1993 | Gallo et al. | 385/14 |
| 5,349,599 | 9/1994 | Larkins | 372/50 |
| 5,416,861 | 5/1995 | Koh et al. | 385/14 |
| 5,508,835 | 4/1996 | Takahsahi et al. | 385/14 X |
| 5,568,574 | 10/1996 | Tanguay, Jr. et al. | 385/14 |

OTHER PUBLICATIONS

K. Rajasekharan & T. Michalka, "Proposed Electro–Optic Package with Bi–Directional Lensed Coupling", SPIE vol. 1389 Inter. Conf. on Advances in Interconnection and Packaging (199.

Y.S. Liu, et al. "Polymer Optical Interconnect Technology (POINT)—Optoelectronic Packaging and Interconnect for-Board and Backplane Applications", Crit. Rev. of Optical Science and Technology SPIE (1995).

H.B. Bakoglu, Circuits, Interconnections, and Packaging for VLSI, Addison–Wesley Publish Co., Inc., chap. 3 (1990).

B.L. Clymer & J.W. Goodman, "Optical Clock Distribution to Silicon Chips", Optical Engineering, vol. 25 (10) (1986).

H. Zarschizky, et al., "Holographic Optical Elements for Free Space Clock Distribution", SPIE vol. 1389 Internat. Conf. on Advances in Interconnection and Packaging (1990).

C. Sebillotte, "Holographic Optical Backplane for Boards Interconnection", SPIE vol. 1389 Internat. Conf. on Advances in Interconnection and Packaging (1990).

Primary Examiner—Brian Healey
Attorney, Agent, or Firm—Blakely, Sokoloff, Taylor & Zafman

[57] ABSTRACT

A method and an apparatus for optically clocking an integrated circuit in a semiconductor. In one embodiment, a laser is configured to emit infrared laser pulses at a desired clock frequency. The laser pulses are separated into a plurality of split laser pulses, each of which are focused through the back side of a C4 packaged integrated circuit die into P-N junctions distributed throughout the integrated circuit die. Each P-N junction locally generates a photocurrent in response to the split laser beams. Each of the photocurrents are locally converted into voltages and thus into local clock signals, which are used to clock the local area of the integrated circuit. With the presently described optical clocking technique, the local clock signals have extremely low clock skew. The presently described technique may be employed in integrated circuits system-wide, in multi-chip modules, or in an individual integrated circuit. By removing the global clock distribution network from the silicon, the present invention allows chip area used in the prior art for a global clock distribution networks to be used instead for signal routing or allows overall die sizes to be reduced.

31 Claims, 8 Drawing Sheets

METHOD AND APPARATUS FOR DISTRIBUTING AN OPTICAL CLOCK IN AN INTEGRATED CIRCUIT

BACKGROUND OF THE INVENTION

1. Field of the Invention

The present invention relates generally to integrated circuit clocking and, more specifically, the present invention relates to optical clock distribution networks in integrated circuits.

2. Description of the Related Art

An issue facing the integrated circuit industry today is the problem of distributing clock signals throughout an integrated circuit die with low clock skew. Clock skew is the difference in arrival times of clock edges to different parts of the chip. Synchronous digital logic requires precise clocks for the latching data. Ideal synchronous logic relies on clocks arriving simultaneously to all the circuits. Clock skew reduces the maximum operating frequency of the circuit as the circuit has to be designed for worst case skew for it to operate reliably. The principle cause of clock skew in the global clock distribution of an integrated circuit is the variation in the routing impedance of the clock distribution within the die. Hence clock skew arises even with an equal length clock distribution network such as an H-Tree. A good rule of thumb in the industry is that clock skew budget is approximately 10% of the cycle time. Hence for a 1 GHz clock frequency, which corresponds to a 1 ns cycle time, the tolerable clock skew is less than or equal to 100 ps. As VLSI clock frequencies increase beyond 1 GHz, the requirement on the clock skew becomes more challenging.

Figure 1A:
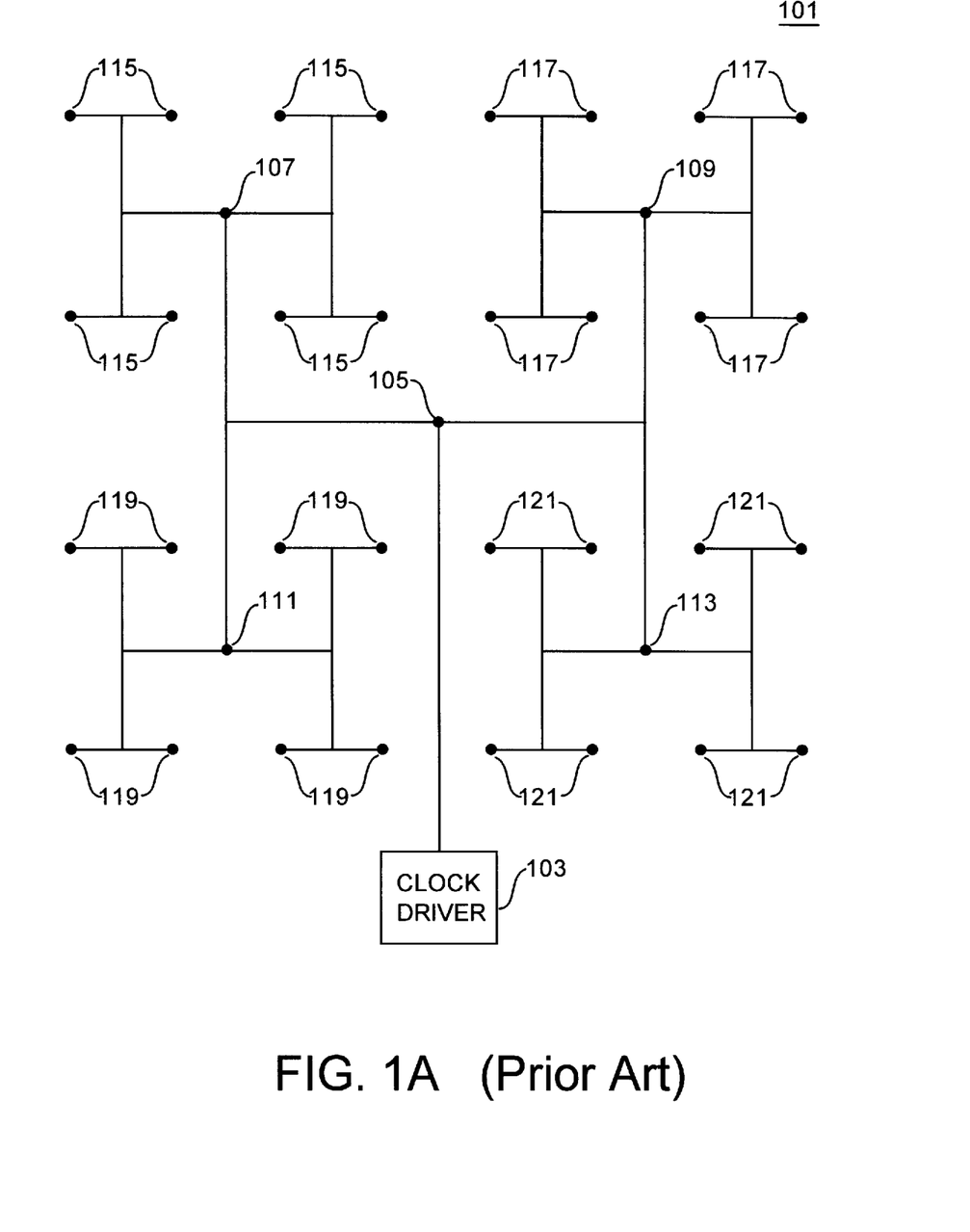
FIG. 1A is an illustration of a hierarchical H-tree clock distribution network.

In today's prior art global clock distribution network clock skew is controlled by the use of hierarchical H-trees. FIG. 1A is a diagram illustrating such a hierarchical H-tree clock distribution network 101 that is implemented in high speed integrated circuits to reduce or eliminate the clock skew effect. As shown in FIG. 1A, a clock driver 103 is used to drive H-tree network 101 at the center node 105. It is appreciated that clock driver 103 is typically a very large driver in order to provide sufficient drive to H-tree network 101, which typically has a large capacitance in today's complex high speed integrated circuits. As can be observed in FIG. 1A, the clock paths of the "H" formed between nodes 107, 109, 111 and 113 have equal lengths between center node 105 and each of the peripheral points of the "H" at nodes 107, 109, 111 and 113. Therefore, assuming a uniform propagation delay of a clock signal per unit length of the H-tree network 101, there should be no clock skew between the clock signal supplied to nodes 107, 109, 111 and 113 from clock driver 103.

FIG. 1A further illustrates H-tree network 101 taken to another hierarchical level with an "H" coupled to each respective peripheral node of the first level "H." Accordingly, every peripheral node 115 is an equal distance from node 107. Every peripheral node 117 is an equal distance from node 109. Every peripheral node 119 is an equal distance from node 111. Finally, every peripheral node 121 is an equal distance from node 113. Therefore, the clock paths from all nodes labeled 115, 117, 119 and 121 are an equal distance from clock driver 103 and therefore should have no clock skew between them since the clock delay from clock driver 103 should be equal to all peripheral nodes of the H-tree network 101. Thus, each node 115, 117, 119 and 121 can be configured to act as a receiving station for a clock signal and service the clocking requirements of an area of the integrated circuit near the node with negligible clock skew with reference to the other similarly configured nodes of the H-tree network 101.

As integrated circuits continue to become larger, more complex and run at higher frequencies, clock skew continues to be a challenging issue, even with an H-tree network 101 since the H-tree network 101 clock lines do not always have uniform characteristic impedance. As a result, there may be a non-uniform propagation delay of a clock signal traveling through the paths H-tree network 101 even though nodes 115, 117, 119 and 121 are in equal distance from clock driver 103. Consequently, there is an unpredictable clock skew at the end points of the H-tree clock distribution network 101.

In addition to clock skew the clock distribution on the chip consumes valuable routing resources in integrated circuits that could be better used for signals and thereby improve signal routability. An additional concern integrated circuit designers must consider is that prior art global clock distribution networks also consume an increasing amount of integrated circuit die area as well as power. For instance, the global clock distribution on today's high speed integrated circuit chips typically accounts for approximately 10% of the chip power.

Other prior art techniques of distributing clock signals throughout an integrated circuit have been investigated. Some of these prior art techniques include an optical clock distribution network 151 illustrated in FIG. 1B. An off chip optical source 153 generates an optical clock signal 155 which is split with hologram 157 into split beams 159 and 161. A direct line of sight is provided to the detectors 163 and 165 from the front side surface 179 of integrated circuit die 171 to receive split beams 159 and 161 respectively. Clock signal 167 is generated by detector 163 and clock signal 169 is generated by detector 165. Since the clock signal is then locally distributed from the detectors 163 and 165 using on chip metal interconnects clock signals 167 and 169 are available to clock their respective areas of the integrated circuit.

Figure 2A:
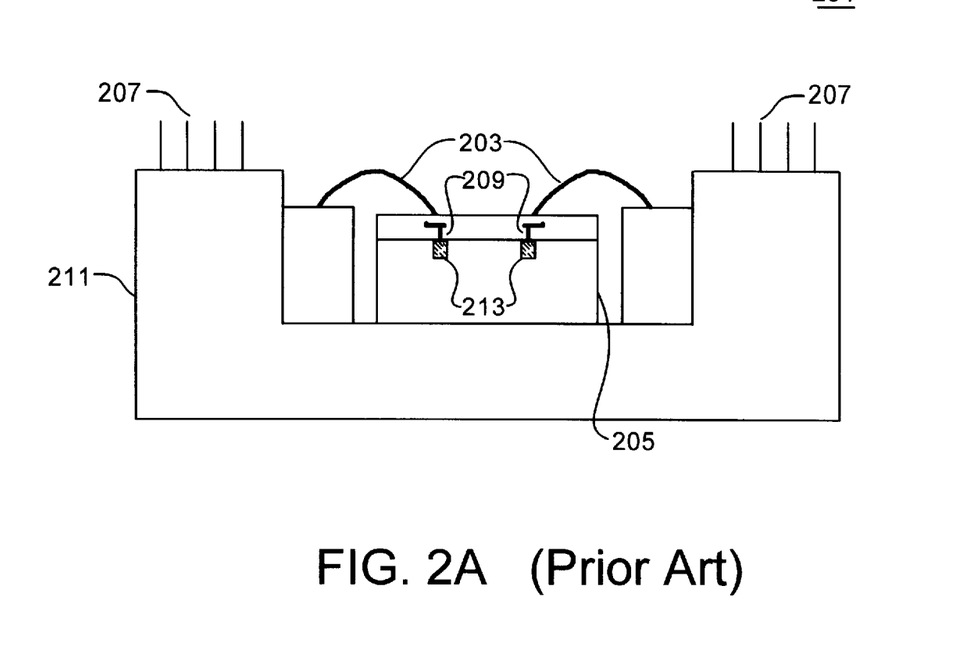
FIG. 2A is an illustration showing present day wire bond technology.
Figure 2B:
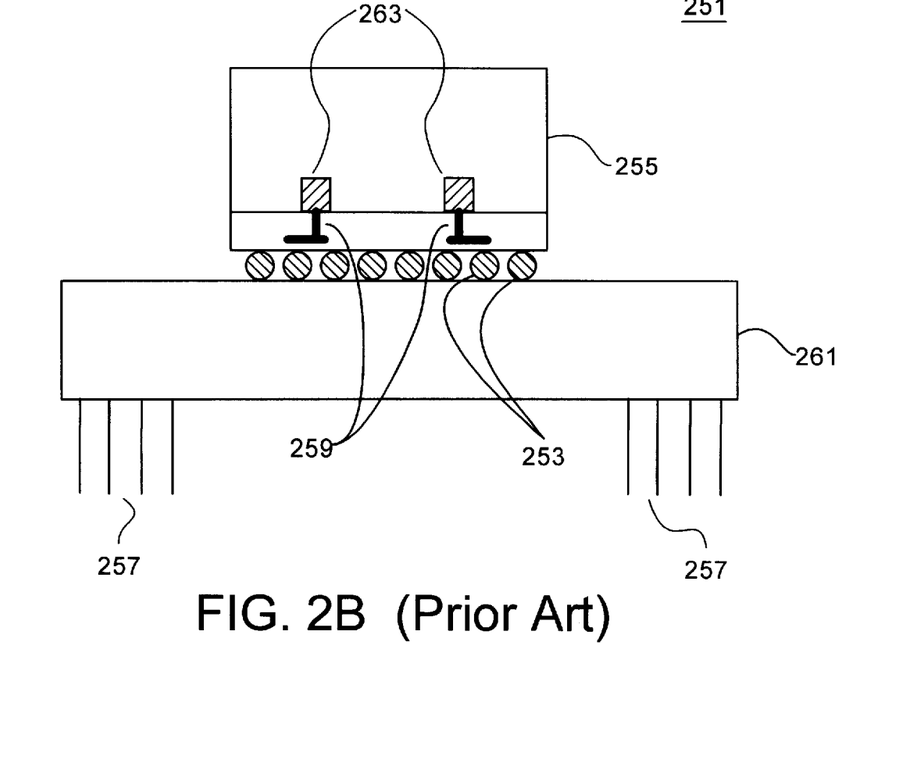
FIG. 2B is an illustration showing flip chip or C4 packaging technology.

A major difficulty with the prior art optical clock distribution is the difficulty in implementing it for advance packaging technologies such as Control Collapse Chip Connection (C4) packaged chips (sometimes referred to as flip chip) and C4/MCM (multi chip modules). FIG. 2B is an illustration of a C4 packaged chip 251. C4 is the packaging of choice for future high frequency chips as it provides high density low inductance connections using ball bonds 153 between chip 255 and package 261 by eliminating the high inductance bond wires as are used in today's wire bond packages. FIG. 2A is an illustration of a chip 201 using today's wire bond packages. As shown in FIG. 2A, wire bonds 203 are used for connections between package 211 and chip 205. For C4 packaging, the front side of the chip is no longer accessible and with the prior art optical routing, the routing would need to be integrated into the package itself. This places extremely complex constraints on the design of the C4 substrate which now has to have both electrical and optical routing.

Figure 1B:
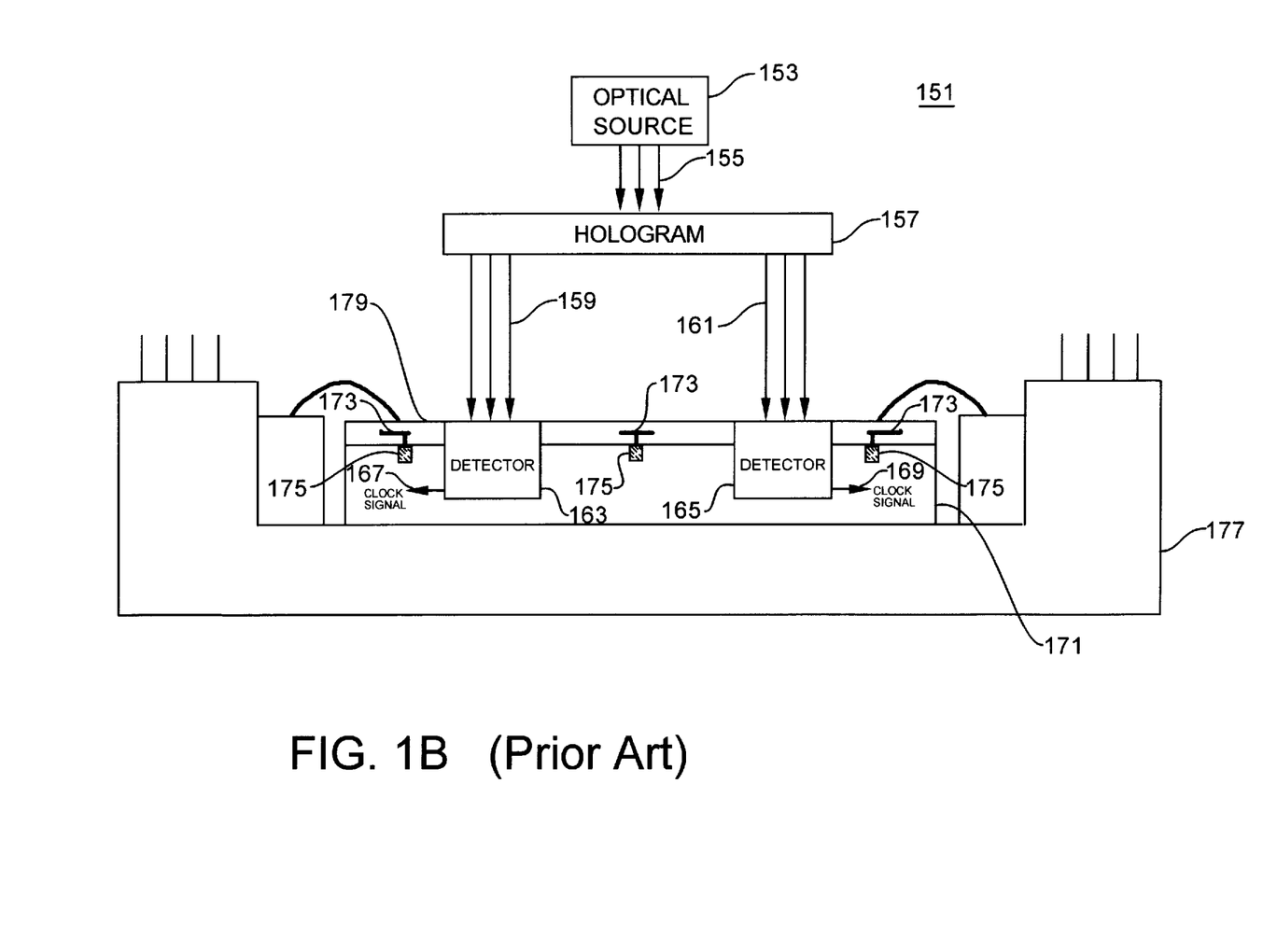
FIG. 1B is a diagram of a prior art optical clock distribution network utilizing photodetectors disposed on the surface of the front side of an integrated circuit die.

Another important problem with the prior art optical distribution network 151 is that the requirement of locating detectors 163 and 165 in the line of sight of split beams 159 and 161 from the front side surface 179 of integrated circuit 171 is a challenging task with modern integrated circuits which typically utilize five or more metal interconnect layers. With the stacking of a large number of metal interconnect layers, creating a line of sight between the split beams 159 and 161 and detectors 163 and 165, without incurring routing congestion becomes an extremely challenging task. This is because line of sight implies that there should be no metal routing at any level of interconnect above the P-N junction detectors. Hence the P-N junction detectors become routing obstacles and as the number of detectors increases this leads to an increase in the die size which generally reduces manufacturing yields and performance.

Thus, what is needed is a clock distribution network that overcomes the problems of the prior art. Such a clock distribution network would provide minimal clock skew to high speed, high power integrated circuits packaged into C4 (flip chip) and C4/MCM packaging and be fully compatible with the back side heat sink attachment for these packages. Secondly, the clock distribution network should reduce the power dissipation due to global clock distribution by eliminating the large capacitive load of the global network. In addition, such a clock distribution network should not interfere with on chip signal routing and would be able to provide low skew clock distribution as integrated circuit chips increase in size, complexity and operate at increasing clock frequencies.

SUMMARY OF THE INVENTION

A method and an apparatus for optically clocking an integrated circuit in a semiconductor is described. In one embodiment, a laser is configured to emit laser pulses at a clock frequency through a back side of a semiconductor into a P-N junction disposed in the semiconductor. A current to voltage converter coupled to the P-N junction converts a photocurrent generated in the P-N junction into a clock signal, which is configured to clock an area of the integrated circuit. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus for optically clocking an integrated circuit in a semiconductor is disclosed. In the following description numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention.

The present invention provides a method and apparatus for clocking an integrated circuit by bringing in optical clock signals through the back side of the semiconductor with a mode locked or modulated infrared or visible laser and focusing the light into P-N junction receivers embedded in the integrated chip circuitry through the silicon substrate. The present invention includes the advantage of employing optical techniques that can be used without disturbing the conventional CMOS process and C4 packaging technology. The beam splitting and focusing elements utilized by the present invention may be fabricated into optical elements separate from the silicon or optical wave guides may be deposited or micro-machined on the silicon backside. By ensuring an equal path length from the master laser of the present invention to the P-N junction photo receivers, that portion of the clock skew that arises in the global clock distribution network can be minimized with the present invention as clock frequencies continue to increase. By replacing the global clock distribution network in the silicon chip with the presently described optical clock distribution network, chip area and chip power dissipation can also be saved. In addition, by freeing up the silicon chip area formerly used in the prior art for global clock routing, integrated circuit die sizes may be reduced. Since the clock distribution is decoupled from the silicon and package with the present invention, the clock distribution becomes scaleable to take advantage of developments and optics technology.

In one embodiment of the present invention, an off chip infrared laser is configured as an optical clock to generate and emit infrared laser pulses at a desired clock frequency. Since silicon is partially transparent to infrared light, the laser pulses may be configured to penetrate the silicon and may be focused into receiving stations that include P-N junctions disposed within the silicon to create photocurrents. It is appreciated that heavily doped silicon is partially transparent to infrared radiation at a wavelength that is just around the silicon band gap. In particular, the band gap of intrinsic silicon at room temperature is 1.11 eV. Heavy doping causes the band gap to shrink by around 100 meV to 1.01 eV.

Figure 3:
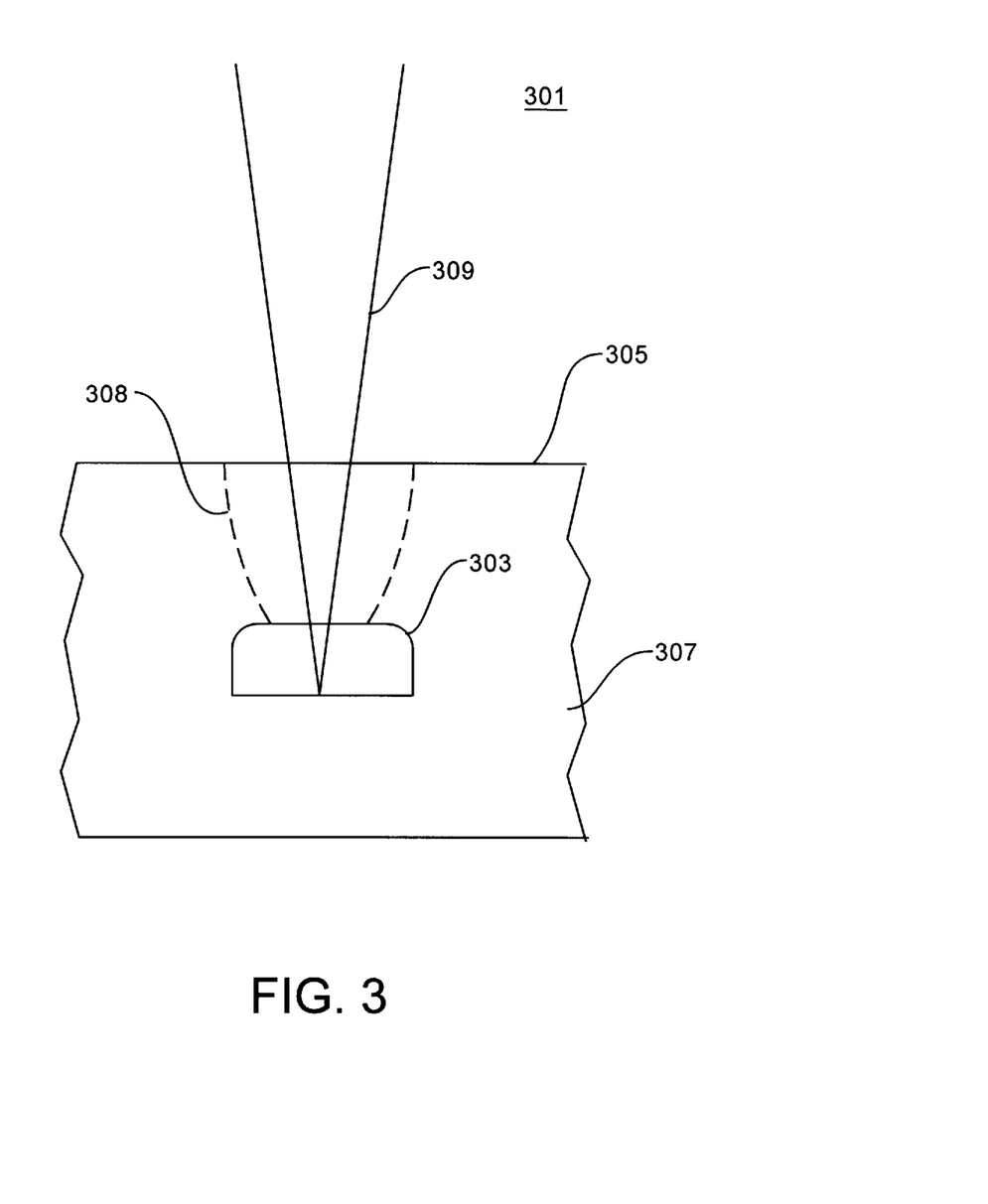
FIG. 3 is a diagram of a laser pulse being emitted into a P-N junction through a back side of a semiconductor.

FIG. 3 shows a portion of a receiving station 301 in accordance with the teachings of the present invention, which includes a P-N junction 303 disposed in a semiconductor 307. In one embodiment of the present invention, semiconductor 307 is made of silicon. It is appreciated that semiconductor 307 is part of a C4 packaged integrated circuit such that the back side 305 of the integrated circuit is therefore exposed. As a result, an infrared laser pulse 309 may be focused through the back side 305 of semiconductor 307 into P-N junction 303. As a result of the energy from laser pulse 309 being focused into P-N junction 303, a photocurrent is produced that, as will be discussed, is converted into a voltage and ultimately a clock signal in accordance with the teachings of the present invention. In one embodiment of the present invention, the laser pulse 309 is optically split and focused through the back side 305 of semiconductor 307 into to a number of similarly configured P-N junctions 303.

In one embodiment of the present invention, a Neodymium: Yttrium, Lithium Fluoride (Nd:YLF) laser is utilized, which generates photons with a wavelength of 1.054 μm, and an energy of approximately 1.178 eV. Accordingly, the Nd:YLF photons from the infrared laser can be transmitted through the silicon from the back side directly into photo receiver diodes, or P-N junctions, embedded in the circuitry of a C4 packaged chip. The laser radiation will penetrate the silicon and generate photocurrents in P-N junctions. In one embodiment of the present invention, the transmission of the photons of a laser having a wavelength of 1.06 μm has been measured to be approximately 1–2% through a substrate approximately 720 μm thick.

Figure 4:
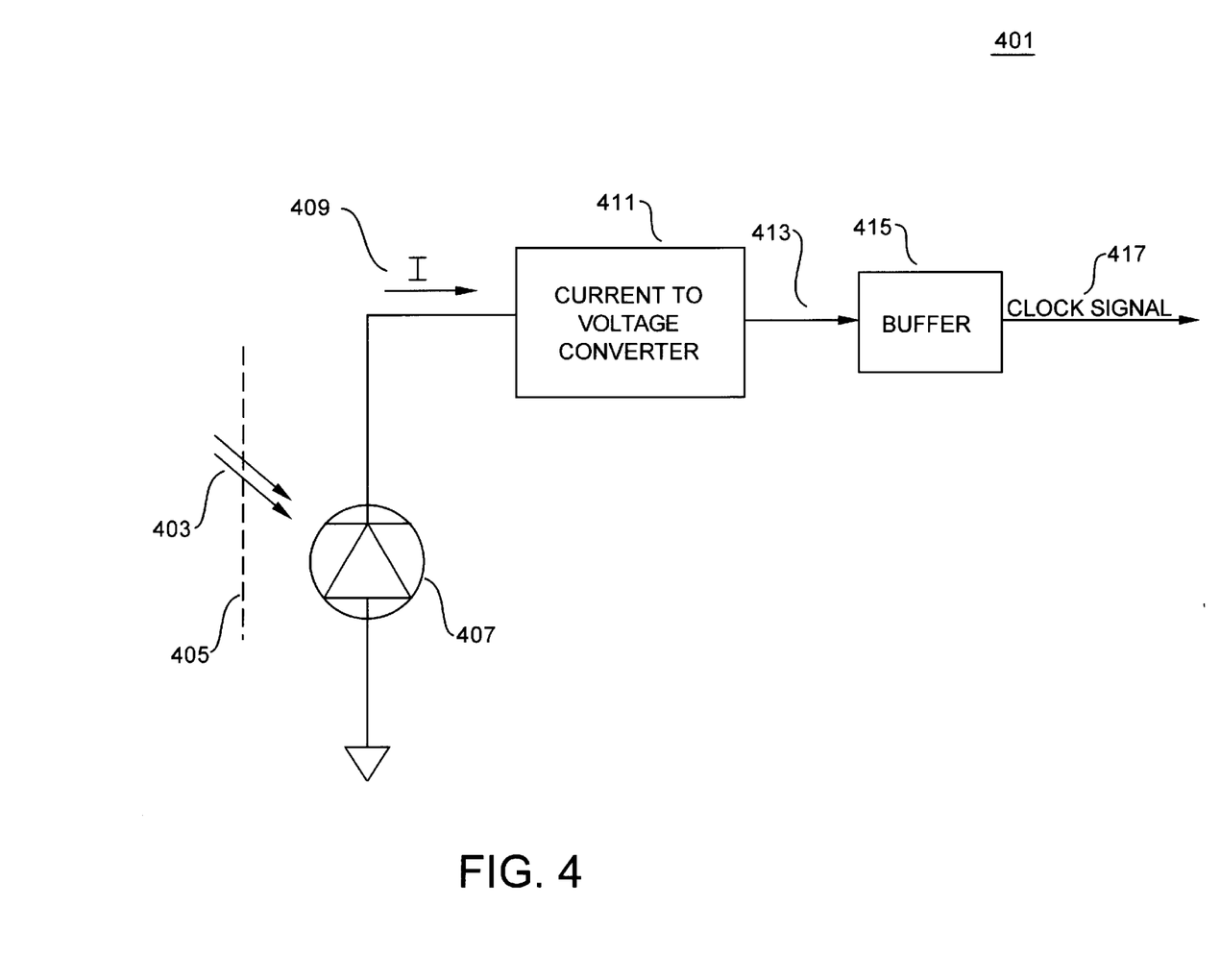
FIG. 4 is a block diagram of an optical clock receiver station in accordance with the teachings of the present invention.

FIG. 4 is an illustration of a receiving station 401 in accordance with the teachings of the present invention, which includes a photo detector 407 disposed in a semiconductor with a laser pulse 403 focused on the photo detector 407 through the back side 405 of the semiconductor. As a result of the laser pulse 403, a photocurrent I 409 is generated which is converted to a voltage V 413 with a current to voltage converter 411.

Voltage V 413 is buffered with buffer 415 to generate clock signal 417. In one embodiment of the present invention, photo detector 407 is a P-N junction disposed in the semiconductor. A plurality of receiving stations 401 may be distributed throughout the integrated circuit die to provide clock signal 417 to clock a designated area of the integrated circuit. In one embodiment of the present invention, clock signal 417 clocks an area of the integrated circuit near receiving station 401. By having a plurality of receiver stations 401 to generate clock signals 417, the clock can be optically distributed throughout the integrated circuit with minimal clock skew.

In one embodiment of the present invention, well known circuit techniques are used to convert photocurrent I 409 to voltage V 413 and to buffer V 413 to generate clock signal 417. Photo detector 407, current to voltage converter 411 and buffer 415 are optimized for sensitivity and jitter since it is appreciated that the actual chip skew is determined in part by the degree of matching of receiving stations 401 across the die. In addition it is noted that the amount of local buffering employed in each receiving station 401 impacts actual clock skew since each additional local buffering stage correspondingly introduces additional clock skew.

Figure 5:
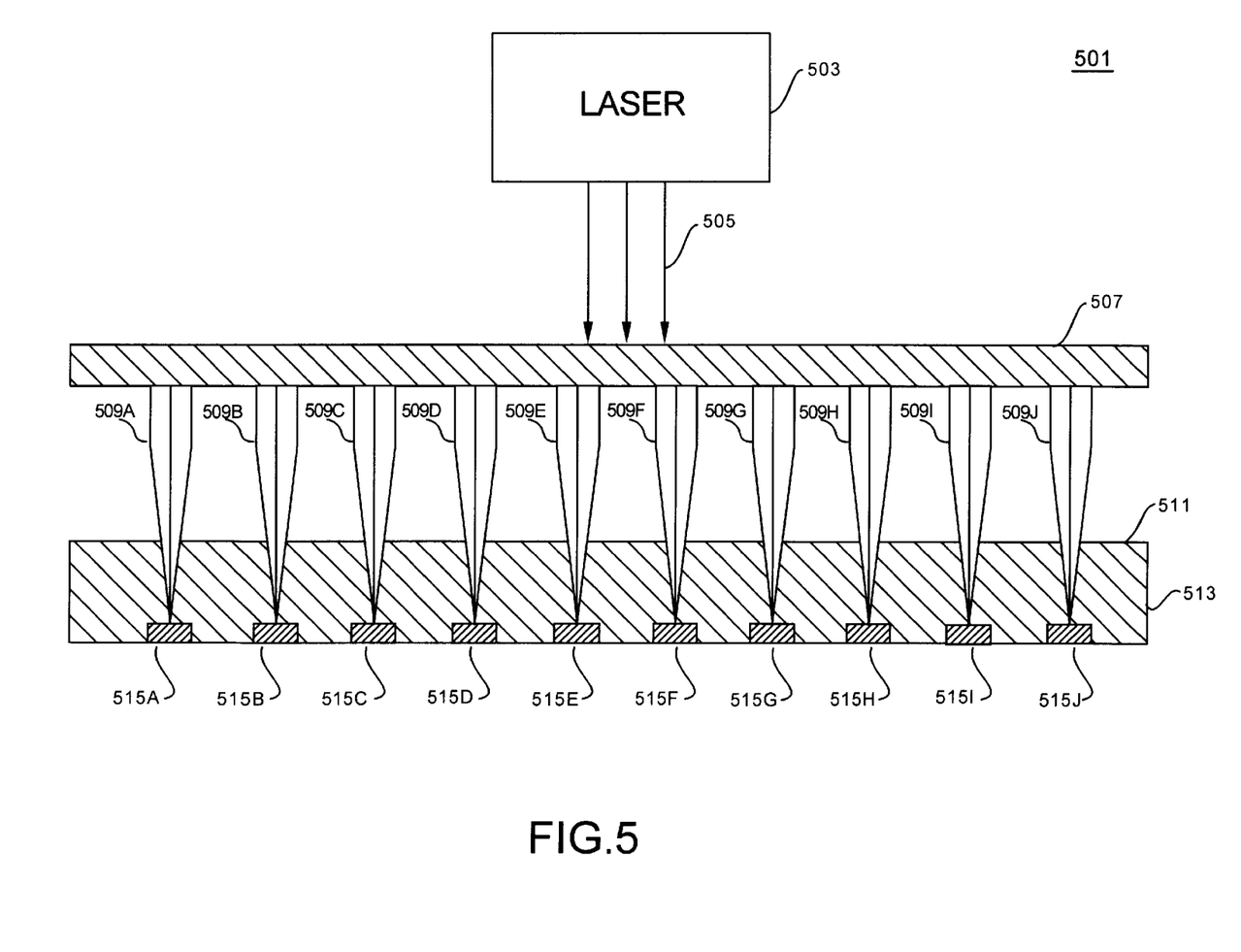
FIG. 5 is a diagram of an optical clock distribution network in accordance of the teachings of the present invention.

FIG. 5 is an illustration of one embodiment of the presently described optical clock distribution network 501 in accordance with the teachings of the present invention. A master laser 503 is configured to emit master laser pulses 505 at a desired clock frequency. An optics element 507 receives master laser pulses 505 and generates split laser pulses 509A–J as shown in FIG. 5. In one embodiment of the present invention, optical element 507 uses well known techniques to split, collimate and focus split laser beams 509A–J into P-N junctions 515A–J through the back side 511 of a semiconductor 513 of a C4 packaged integrated circuit. Each P-N junction 515A–J is separately included in a receiving station similar to that described in FIGS. 3 and 4 above. Accordingly, a separate clock signal may be generated by each P-N junction 515A–J and may therefore be used to clock a specific area of circuitry in the integrated circuit.

As can be appreciated in FIG. 5, the clock of the integrated circuit is optically distributed throughout the chip thereby removing the clock distribution network from the silicon and thus eliminating the problems associated with prior art clock distribution networks such as the H-tree network 101 discussed in FIG. 1 above.

In addition, by optically distributing the clock signal through the back side 511 of the semiconductor 513, the problems and complexities associated with the prior art optical clock distribution network 151 shown in FIG. 1B above are avoided. In particular, the presently described optical clock distribution network 501 does not interfere with chip signal routing. Since access to P-N junctions 515A–J is not obstructed by metal interconnects or a package substrate, in contrast with the prior art, providing line of sight to P-N junctions 515A–J in the present invention do not result in the same complex routing requirements and congestion of metal interconnects 173 of prior art optical clock distribution network 151.

In one embodiment of the present invention, the path lengths of master laser beam 505 through split laser beams 509A–J into P-N junctions 515A–J are all made equal length to minimize any clock skew between each P-N junction 515A–J. In another embodiment, controlled skew is easily achieved with the present invention by deliberately delaying the optical signal by implementing a longer optical path length within optical element 507. In yet another embodiment of the present invention, optical element 507 is connected to laser 503 with an optical fiber. In another embodiment of the present invention, optical element 507 is disposed between the silicon of substrate 513 and a heat sink (not shown). In that embodiment, optical element 507 is sandwiched between the silicon and the heat sink using well known techniques such that heat is sufficiently dissipated from the integrated circuit die.

As discussed above, optics element 507 splits, collimates and focuses laser beams 509A–J into P-N junctions 515A–J using well known techniques. In one embodiment, optics element 507 includes a fiber optic system is employed to split the laser power and distribute and focus it into P-N junctions 515A–J. This embodiment includes individual micro-lenses at the ends of the fiber optic elements and any required matching of the silicon/air refractive index to maximize the light coupling into the silicon.

In embodiment, a computer generated hologram may be used to generate each split laser beam 509A–J. In yet another embodiment of the present invention, optics element 507 includes etch phase hologram gratings directly on the silicon back side for splitting and focusing the infrared laser light. This embodiment has the advantage of self aligning the fan-out beams of the receivers to the accuracy of the lithographic registration of the manufacturing process used. In another embodiment of the present invention, optics element 507 includes wave guides fabricated from glass or a polymeric on the silicon back side to split, bend, collimate and focus laser beams 509A–J into P-N junctions 515A–J.

Figure 6:
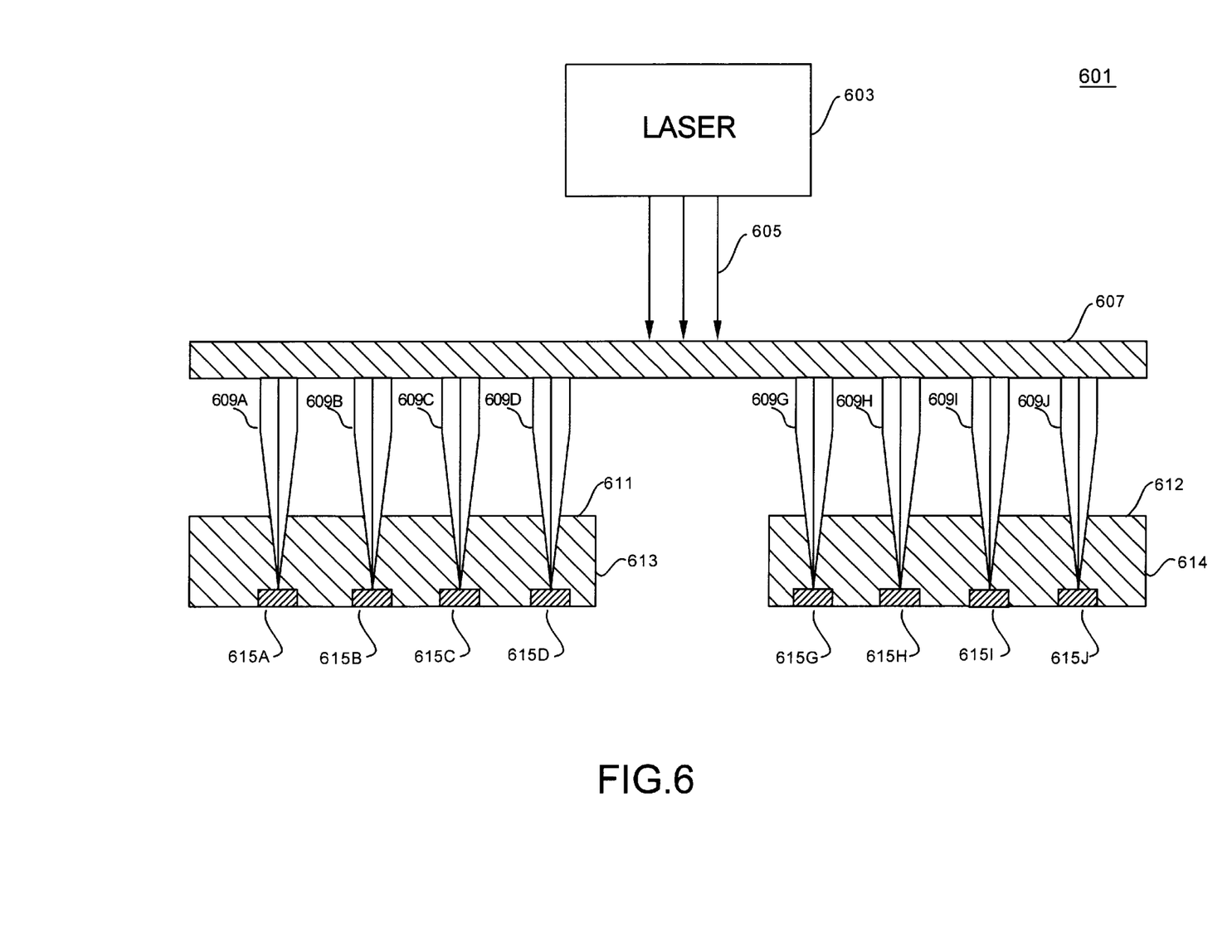
FIG. 6 is a diagram of another embodiment of an optical clock distribution network in accordance of the teachings of the present invention.

FIG. 6 is an illustration of another embodiment of the presently described optical clock distribution network 601, which includes a master laser 603 emitting laser pulses 605 at a clock frequency into an optics element 607. Optics element 607 splits master laser beam 605 into split laser beams 609A–D and 609G–J. Split laser beams 609A–D are focused into P-N junctions 615A–D through the back side 611 of semiconductor 613. Split laser beams 609G–J are focused into P-N junctions 615G–J through back side 612 of another semiconductor 614. As can be appreciated from FIG. 6, semiconductors 613 and 614 are not included in the same chip. Accordingly, the present optical clock distribution network provides a clock signal to all of the receiving stations with extremely low clock skew to multiple chips in a computer system.

In one embodiment of the present invention, semiconductors 613 and 614 are the integrated circuit dies of a multi-chip module. In another embodiment of the present invention, semiconductors 613 and 614 are included in the integrated circuit dies of an entire computer system. That is, optical clock distribution network 601 provides the clock for an entire computer system with minimal clock skew and is therefore not limited to merely providing a clock signal for a single integrated circuit die. Each integrated circuit die of the present invention includes P-N junctions 615 to generate a local clock signal to clock a nearby area on the integrated circuit.

Figure 7:
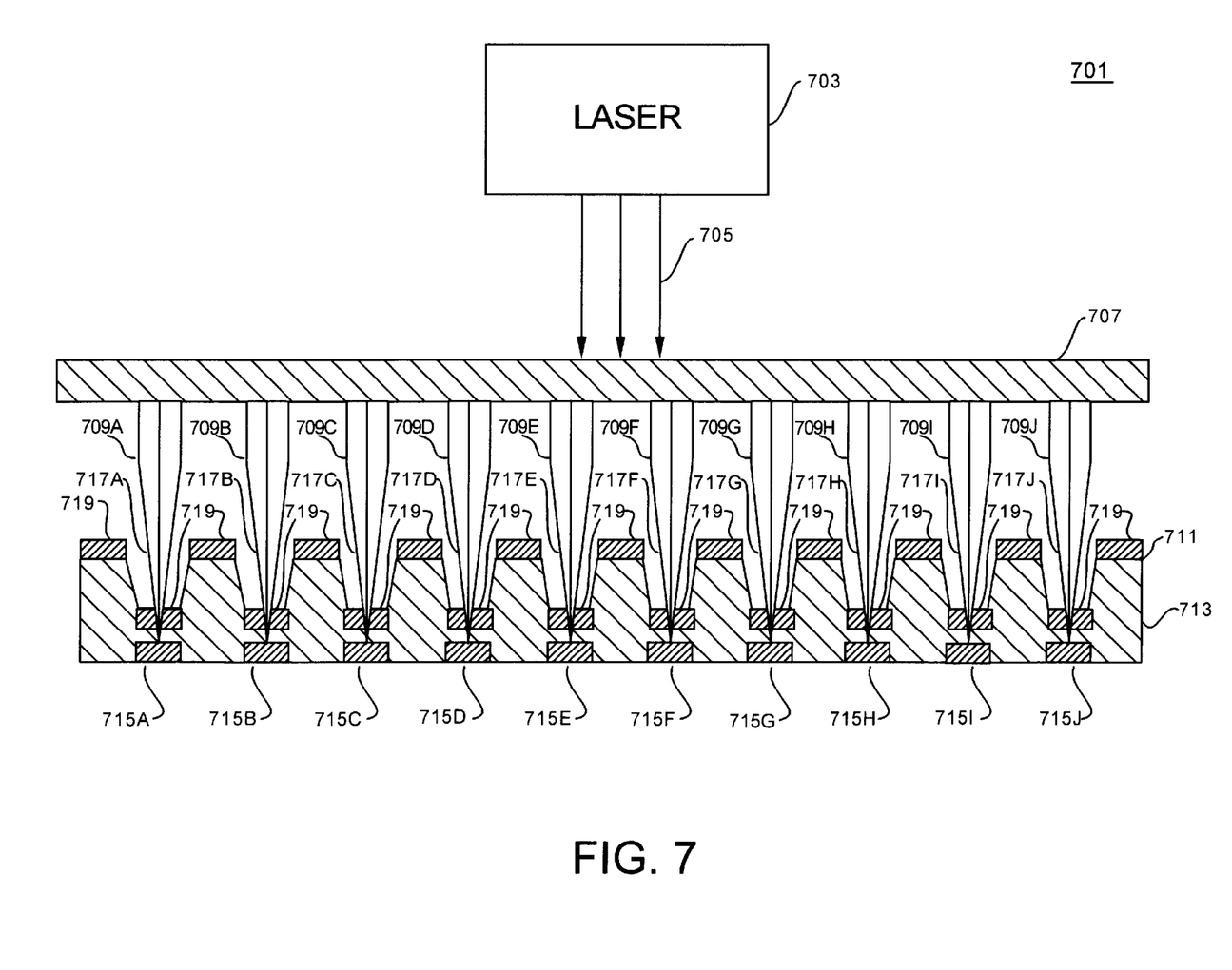
FIG. 7 is a diagram of yet another embodiment of an optical clock distribution network in accordance with the teachings of the present invention.

FIG. 7 is an illustration of another embodiment of an optical clock distribution network 701 in accordance with the teachings of the present invention. Master laser 703 is configured to emit master laser pulses 705 at a desired clock frequency into optics element 707, which splits master laser beam 705 into split laser beams 709A–J. To compensate for attenuation that occurs in split laser beams 709A–J after penetrating the back side 711 of the semiconductor 713, recesses 717A–J have been added to semiconductor 713 on the back side 711 to locally thin the semiconductor 713 disposed between P-N junctions 715A–J and master laser 703. As a result, split beams 709A–J do not travel through as much semiconductor material in comparison with optical clock distribution network 501 shown in FIG. 5. Thus, the amount of attenuation of split laser beam 709A–J before reaching P-N junctions 715A–J is reduced and infrared laser transmission is improved into each P-N junction 715A–J. In one embodiment of the present invention, recesses 717A–J may be micro-machined or milled using well known techniques such as for example an anisotropic wet etch or any other techniques used to form trenches, vias or the like in today's integrated circuits.

Another technique used to increase the efficiency of split laser beams 709A–J reaching P-N junctions 714A–J is the minimize the amount of laser power reflected off the back side 711 of semiconductor 713. One embodiment of the present invention includes an anti-reflective coating 719 which is disposed on the back side 711 of semiconductor 713. Which anti-reflective coating 719 on the back side 711 of semiconductor 713, the amount of energy reflected from the back side 711 of semiconductor 713, the reduced resulting in an improved light coupling into semiconductor 713. By using techniques such as the application of anti-reflective coating 719 and the milling of semiconductor 713 above each P-N junction 715A–J, the amount of laser energy applied to each receiver station is increased resulting in higher efficiency of optical clock distribution network 701.

In another embodiment of the present invention, referring back to FIG. 3, laser pulse 309 is not limited to being an infrared laser. In that embodiment, a substantial portion 308 of semiconductor 307 is milled away to form a trench or recess such that laser pulse 309 is not required to penetrate more than approximately 0.2–1.0 $\mu$m of semiconductor material (depending on the precise wavelength used) before reaching P-N junction 303. With most of the portion 308 removed from semiconductor 307, a visible (~0.4–0.7 $\mu$m) or near infrared (~0.7–1.0 $\mu$m) light laser pulse 309 may be directly focused from the back side 305 of semiconductor 307 into P-N junction 303 and generate photocurrents in accordance with the teachings of the present invention. By keeping the approximately 0.2–1.0 $\mu$m of the semiconductor material, the P-N junction is kept in tact.

The main advantage to using a visible or near infrared source is in improved optical to electrical conversion efficiency in the receivers. This is because the photon energy for visible and near infrared parts of the spectrum is much higher than in the infrared (wavelength $\geq$ 1.1 $\mu$m) part of the spectrum and the light absorption in the diodes is much more efficient ($\lambda \times E = 1.24$, where $\lambda$ is the photon wavelength in $\mu$m and E is the photon energy in eV). This also means that less optical power is required with a visible source. The 0.2–1.0 $\mu$m of semiconductor material remaining ensures that a P-N junction is present while minimizing the optical attenuation through the semiconductor material.

For example, optical beams with photon energies higher than the silicon band gap will be attenuated exponentially through the silicon. The characteristic attenuation becomes larger as the wavelength is reduced. However, when the thickness of the silicon is as small as 0.2–1.0 $\mu$m, the attenuation is negligible. For near infrared operation, the remaining silicon thickness can be up to 1.0 $\mu$m without significant attenuation. For visible operation, the remaining silicon thickness should be in the 0.2 $\mu$m region. In one embodiment, the trench or recess is back filled with material that is transparent to visible or near infrared radiation in order to protect the exposed receivers with this arrangement.

Thus, what has been described is a method and apparatus for optically clocking an integrated circuit in a semiconductor. With the presently described optical clock distribution network, many identical clocks with relatively no skew can be distributed to a high frequency integrated circuit. Furthermore, the present invention provides optical clocking with no clock skew for multi-chip modules or the chips of an entire computer system. In addition, the presently described optical clock distribution network removes large global clock drivers and the global clock distribution from the silicon chip, which results in a savings in chip power dissipation, provides additional chip area available for signal routing, or allows the reduction of overall die size which will in turn lead to higher manufacturing yields and higher frequency operation resulting from shorter interconnect lengths.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical clock distribution network, comprising:
   a first P-N junction disposed in a first semiconductor including at least a front and back side;
   a master laser configured to emit master laser pulses at a master clock frequency through the back side of the first semiconductor into the first P-N junction; and
   a first current to voltage converter coupled to the first P-N junction, the first current to voltage converter generating a first clock signal configured to clock a first area of an integrated circuit disposed in the first semiconductor.

2. The optical clock distribution network described in claim 1 further comprising a first buffer coupled between the first current to voltage converter and the first area of the integrated circuit.

3. The optical clock distribution network described in claim 1 further comprising:
   a second P-N junction in the first semiconductor;
   an optics element coupled between the master laser and the first and second P-N junctions, the optics element configured to split the master laser pulses into first and second split laser pulses focused through the back side of the first semiconductor into the first and second P-N junctions respectively; and a second current to voltage converter coupled to the second P-N junction, the second current to voltage converter generating a second clock signal configured to clock a second area of the integrated circuit in the first semiconductor, the first and second clock signals having the master clock frequency.

4. The optical clock distribution network described in claim 1 further comprising:

a second P-N junction in a second semiconductor;

an optics element coupled between the master laser and the first and second P-N junctions, the optics element configured to split the master laser pulses into first and second split laser pulses, the first split laser pulses focused through the back side of the first semiconductor into the first P-N junction, the second split laser pulses focused through a back side of the second semiconductor into the second P-N junction; and a second current to voltage converter coupled to the second P-N junction, the second current to voltage converter generating a second clock signal configured to clock a second area of an integrated circuit in the second semiconductor, the first and second clock signals having the master clock frequency.

5. The optical clock distribution network described in claim 1 wherein the first semiconductor includes portions that define a recess disposed between the master laser and the first P-N junction, the recess increasing a transmission of the master laser pulses through the back side of the first semiconductor into the first P-N junction.

6. The optical clock distribution network described in claim 3 wherein the optics element is configured to split the first and second split laser pulses with substantially no skew between the first and second split laser pulses.

7. The optical clock distribution network described in claim 3 wherein the optics element comprises a first micro lens configured to focus the first split laser pulses and a second micro lens configured to focus the second split laser pulses.

8. The optical clock distribution network described in claim 3 wherein the optics element comprises a first waveguide configured to focus the first split laser pulses and a second waveguide configured to focus the second split laser pulses.

9. The optical clock distribution network described in claim 3 wherein the optics element comprises a hologram configured to generate the first and second split laser pulses.

10. The optical clock distribution network described in claim 8 wherein the hologram is etched into the back side of the first semiconductor.

11. The optical clock distribution network described in claim 1 wherein the master laser operates at a wavelength approximately equal to 1.054 µm.

12. The optical clock distribution network described in claim 1 wherein the master laser operates at a wavelength approximately equal to 1.06 µm.

13. The optical clock distribution network described in claim 5 wherein the master laser operates at a wavelength approximately equal to 0.4 to 0.7 µm.

14. The optical clock distribution network described in claim 5 wherein the master laser operates at a wavelength approximately equal to 0.7 to 1.0 µm.

15. The optical clock distribution network described in claim 14 wherein the recess is back filled with a visible light transparent material.

16. The optical clock distribution network described in claim 1 wherein the master laser is a mode locked laser.

17. The optical clock distribution network described in claim 1 wherein the master laser is a modulated laser.

18. The optical clock distribution network described in claim 1 wherein the first semiconductor comprises silicon.

19. The optical clock distribution network described in claim 4 wherein the first and second semiconductors are comprised in a multi-chip module.

20. The optical clock distribution network described in claim 4 wherein the first and second semiconductors are comprised in a computer system.

21. A method for optically clocking an integrated circuit in a semiconductor including at least a front and back side, the method comprising the steps of:

operating a master laser configured to emit master laser pulses at a master clock frequency;

focusing the master laser pulses through the back side of the semiconductor into a first P-N junction disposed in the semiconductor;

converting a current generated in the first P-N junction in response to the master laser pulses into a clock signal; and clocking a first area of the integrated circuit disposed in the semiconductor.

22. The method described in claim 21 including the additional step of buffering the clock signal after the step of converting the current generated in the first P-N junction in the clock signal.

23. The method described in claim 21 including the additional step of:

splitting the master laser pulses into first and second split laser pulses;

wherein the step of focusing the master laser pulses through the back side of the semiconductor includes the step of focusing the first and second split laser pulses into the first P-N junction and a second P-N junction respectively.

24. The method described in claim 23 wherein the first and second P-N junctions are disposed in the semiconductor, the second split laser pulses being focused through the back side of the semiconductor.

25. The method described in claim 23 wherein the second P-N junction is disposed in a second semiconductor, the second split laser pulses being focused through a back side of the second semiconductor.

26. The method described in claim 25 including the additional steps of:

converting a current generated in the second P-N junction in response to the second split laser pulses into the clock signal; and clocking a second area of an integrated circuit disposed in the second semiconductor.

27. The method described in claim 21 including the step of thinning a portion of semiconductor disposed between the first P-N junction and the master laser so as to increase a transmission of the master laser pulses through the back side of the semiconductor into the first P-N junction.

28. An optical clock distribution network, comprising:

first photodetection means disposed in a first semiconductor including at least a front and back side for detecting photons;

master laser generation means for generating master laser pulses having photons at a clock frequency, the first photodetection means detecting the master laser pulses through the back side of the first semiconductor; and first clock signal generation means coupled to the first photodetection means for generating a first clock signal in response to the master laser pulses, the first clock signal configured to clock a first area of an integrated circuit disposed in the first semiconductor.

29. The optical clock distribution network described in claim 28 wherein the first clock signal generation means comprises:

first conversion means coupled to the first photodetection means for converting a current signal generated by the first photodetection means to the clock signal; and first buffering means coupled between the first conversion means and the first area of the integrated circuit disposed in the first semiconductor for buffering the clock signal.

30. The optical clock distribution network described in claim 28 further comprising:

second photodetection means disposed in the first semiconductor for detecting photons;

optics means disposed between the master laser generation means and the first and second photodetection means for splitting the master laser pulses into first and second split laser pulses, the optics means focusing the first and second split laser pulses through a back side of the first semiconductor into the first and second photodetection means respectively; and second clock signal generation means coupled to the second photodetection means for generating a second clock signal in response to the master laser pulses, the second clock signal configured to clock a second area of the integrated circuit disposed in the first semiconductor.

31. The optical clock distribution network described in claim 28 further comprising:

second photodetection means disposed in a second semiconductor for detecting photons;

optics means disposed between the master laser generation means and the first and second photodetection means for splitting the master laser pulses into first and second split laser pulses, the optics means focusing the first split laser pulses through the back side of the first semiconductor into the first photodetection means and focusing the second split laser pulses through a back side of the second semiconductor into the second photodetection means; and second clock signal generation means coupled to the second photodetection means for generating a second clock signal in response to the master laser pulses, the second clock signal configured to clock a second area of an integrated circuit disposed in the second semiconductor.

* * * * *

UNITED STATES PATENT AND TRADEMARK OFFICE
CERTIFICATE OF CORRECTION

PATENT NO. : 5,812,708
DATED : September 22, 1998
INVENTOR(S) : Vallur R. M. Rao It is certified that error appears in the above-identified patent and that said Letters Patent is hereby corrected as shown below:

In column 5 at line 19 delete "1409" and insert --I 409--

Signed and Sealed this

Sixth Day of July, 1999

Attest:

Attesting Officer

Q. TODD DICKINSON

Acting Commissioner of Patents and Trademarks